US010461939B2

(12) United States Patent
Church et al.

(10) Patent No.: US 10,461,939 B2
(45) Date of Patent: Oct. 29, 2019

(54) SECURE DEVICE REGISTRATION FOR MULTI-FACTOR AUTHENTICATION

(71) Applicant: CA, Inc., Islandia, NY (US)

(72) Inventors: Dann M. Church, Islandia, NY (US); Michael Moerk, Islandia, NY (US); Doreen E. Collins, Islandia, NY (US); Joanne Pelkey, Islandia, NY (US); Jeff B. Frantz, Islandia, NY (US)

(73) Assignee: CA, Inc., Islandia, NY (US)

( * ) Notice: Subject to any disclaimer, the term of this patent is extended or adjusted under 35 U.S.C. 154(b) by 290 days.

(21) Appl. No.: 15/427,290

(22) Filed: Feb. 8, 2017

(65) Prior Publication Data

US 2018/0227128 A1 Aug. 9, 2018

(51) Int. Cl.
*H04L 9/32* (2006.01)
*H04L 29/06* (2006.01)
*H04L 9/08* (2006.01)

(52) U.S. Cl.
CPC ............ *H04L 9/3247* (2013.01); *H04L 9/088* (2013.01); *H04L 9/0894* (2013.01); *H04L 9/3226* (2013.01); *H04L 63/083* (2013.01); *H04L 63/0853* (2013.01); *H04L 2463/082* (2013.01)

(58) Field of Classification Search
USPC .......................................................... 713/176
See application file for complete search history.

(56) References Cited

U.S. PATENT DOCUMENTS

| 7,373,515 | B2* | 5/2008 | Owen | G06F 21/31 |
| | | | | 713/182 |
| 7,797,545 | B2* | 9/2010 | Adams | G06F 21/629 |
| | | | | 380/44 |
| 8,230,231 | B2* | 7/2012 | Freeman | G06F 21/31 |
| | | | | 380/44 |
| 8,364,978 | B2* | 1/2013 | Fascenda | G06F 21/72 |
| | | | | 380/258 |
| 9,292,987 | B1* | 3/2016 | Myr | H04L 63/0442 |
| 9,714,004 | B2* | 7/2017 | Kawamura | B60R 25/24 |
| 9,820,147 | B2* | 11/2017 | Hwang | H04L 9/0822 |
| 2002/0034304 | A1* | 3/2002 | Yang | H04L 9/0822 |
| | | | | 380/281 |

(Continued)

OTHER PUBLICATIONS

Digital Signature Tutorial, http://www.cs.ucsb.edu/-ckrintz/papers/security/crypto-tutorial.html, Dec. 12, 2001, pp. 1 to 10.
iOS Security—iOS 9.3 or later, http://web.archive.org/web/20160521002331/https://www.apple.com/business/docs/iOS_Security_Guide.pdf, May 2016, pp. 1 to 63.

(Continued)

*Primary Examiner* — Amare F Tabor
(74) *Attorney, Agent, or Firm* — Pillsbury Winthrop Shaw Pittman LLP

(57) ABSTRACT

Provided is a process including: receiving a request from a first computing device to register another computing device; sending to the first computing device a registration code; receiving the registration code from a second computing device; sending an instruction to the designated application to send a value indicative of access to a cryptographic key; receiving from the designated application the value indicative of access to the cryptographic key; determining, based on the received value, that the received registration code was sent by the designated application and not another untrusted application.

20 Claims, 4 Drawing Sheets

(56) References Cited

U.S. PATENT DOCUMENTS

| | | | |
|---|---|---|---|
| 2009/0313171 A1* | 12/2009 | Yacobi | H04L 9/321 |
| | | | 705/51 |
| 2009/0327138 A1* | 12/2009 | Mardani | G06Q 20/10 |
| | | | 705/64 |
| 2013/0232336 A1* | 9/2013 | Cheung | H04L 9/006 |
| | | | 713/156 |
| 2013/0332343 A1 | 12/2013 | Desai et al. | |
| 2015/0312250 A1 | 10/2015 | Redberg et al. | |
| 2015/0365235 A1 | 12/2015 | Hostyn et al. | |
| 2016/0125386 A1 | 5/2016 | Desai et al. | |
| 2016/0125416 A1* | 5/2016 | Spencer | G06Q 20/1085 |
| | | | 705/71 |
| 2016/0125725 A1 | 5/2016 | Sager et al. | |
| 2016/0134599 A1 | 5/2016 | Ross et al. | |
| 2016/0226872 A1 | 8/2016 | Oberheide et al. | |
| 2016/0285847 A1 | 9/2016 | Oberheide et al. | |
| 2017/0026385 A1 | 1/2017 | Zarkesh et al. | |
| 2017/0034141 A1 | 2/2017 | Oberheide et al. | |
| 2018/0091498 A1* | 3/2018 | Kekicheff | H04L 63/0823 |

OTHER PUBLICATIONS

Introduction to Trusted Execution Environments (TEE)—IY5606, 'http://sec.cs.ucl.ac.uk/users/smurdoch/talks/rhul14tee.pdf', Apr. 9, 2014, pp. 1 to 34.
Android Developers—Security Tips, https://developer.android.com/training/articles/security-tips.html, Dec. 16, 2016, pp. 1 to 19.
System and kernel security, https://source.android.com/security/overview/kernel-security.html, Dec. 16, 2016, pp. 1 to 4.

\* cited by examiner

SECURE DEVICE REGISTRATION FOR MULTI-FACTOR AUTHENTICATION

BACKGROUND

1. Field

The present disclosure relates generally to computer security and, more specifically, to multi-factor authentication.

2. Description of the Related Art

Recently, many software applications have migrated to the cloud. Often, user-facing and back-end software applications execute on remote computer systems hosted by various third parties. Examples include productivity suites, calendaring applications, email, document management platforms, enterprise resource planning applications, project management applications, and various databases. When attempting to use these applications, before being granted access, users are often authenticated by the computer system to determine that the person seeking access is authorized to do so.

Two-factor authentication (2fa) is often used to authenticate users during sign-on. Examples include using a user's ability to prove they possess their mobile device to authenticate a session on a different device, like their laptop. In this example, the first factor is often their password being entered into the laptop, and the second factor is often the user supplying a code to the laptop that was texted to their phone. Another example includes asking the user to enter an input on the mobile device responsive to a message sent to an authentication application on the mobile device. In each case, the user provides some input indicative of their access to the mobile device associated with an account they are attempting to access on the laptop. Thus, cross-device authentication often provides an added signal, beyond the user's password, that the user is who the users represents themselves to be.

SUMMARY

The following is a non-exhaustive listing of some aspects of the present techniques. These and other aspects are described in the following disclosure.

Some aspects include a process including: receiving, via a network, a request from a first computing device to register another computing device: as a supplemental factor in a multi-factor authentication protocol, or as an embedded system authorized to access a distributed computing application; after receiving the request, sending to the first computing device, via a network, a registration code to be entered in a designated application executing on another computing device to demonstrate possession of the other computing device to be registered; after sending the registration code to the first computing device, receiving the registration code, via a network, from a second computing device; sending an instruction to the designated application executing on the second computing device instructing the designated application to send a value indicative of access to a cryptographic key stored in memory of the second computing device, wherein cryptographic key is stored in a location or format accessible to the designated application but not to other untrusted applications executing on the second computing device; receiving, via the network, from the designated application executing on the second computing device, the value indicative of access to the cryptographic key; determining, based on the received value and a reference value stored in memory that the received registration code was sent by the designated application and not another untrusted application executing on the second computing device; and based on the determination, registering in memory the second computing device as the supplemental factor or as authorized to access the distributed computing application.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
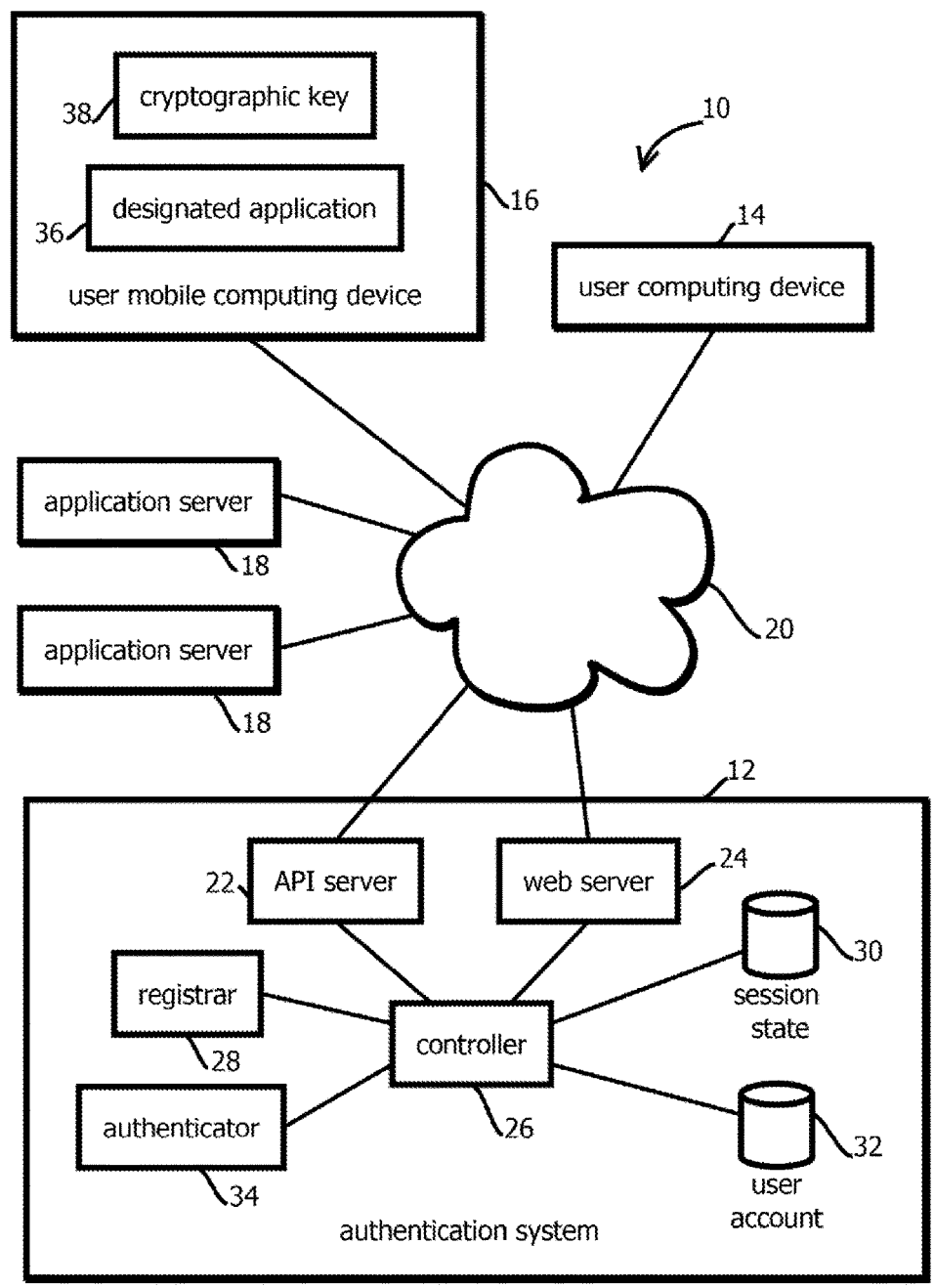
FIG. 1 is a block diagram of a distributed computing environment having an authentication system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cyber security. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In order for a mobile device to be used for 2fa, often mobile device first is established as trustworthy, e.g., when registering a new mobile phone for 2fa. Often, this is done by 1) displaying a relatively short code (as long codes are often difficult for the user to enter) in a user interface (e.g., on a laptop) that the user is accessing to add the mobile phone, 2) asking the user to enter that code in a native application on their mobile phone; 3) sending the entered code with the mobile phone to the server providing the user interface on the other computing device; and 4) associating the mobile phone with the account by the server based on the code received from the mobile phone.

One problem with this approach is that an attacker could intercept or guess the short code and input this code on their own mobile phone before the user has time to do so. One attack includes brute-forcing the 2fa code (e.g., a pin code). An attacker may execute a script on their phone (or emulated phone) that cycles through a range of codes and submits them to the server, in the hope that they happen to hit one that was just issued before the user has time to enter it. Longer codes could defend against this, but are less user-friendly, as users prefer to not enter long strings of text on a mobile phone.

To mitigate these and other issues, some embodiments use a push notification sent to (only fully readable by) a native application on the user's mobile phone to control the processing environment in which the phone returns a signal indicating the phone to be trustworthy (thereby excluding input from scripts running in less trusted environments). In some embodiments, similar techniques may be used to register various embedded systems, such as Internet-of-things appliances, to user accounts, or in other scenarios in which there exists a need to demonstrate that a second computing devices in a user's possession through communications with a first computing device controlled by the user.

In some embodiments, these and other techniques may be implemented in a computing environment 10 shown in FIG. 1. In some embodiments, the computing environment 10 includes an authentication system 12, a user computing device 14, a user mobile computing device 16, a plurality of application servers 18, and the Internet or various other networks 20. In some embodiments, a user operating user computing device 14 may attempt to register their mobile computing device 16 with the authentication system 12, for instance, as a second factor in a multifactor authentication protocol to access one of the application servers 18, or as a registered embedded system authorized to access a distributed computing application, for instance, one for an Internet-of-things distributed application. Two user computing devices 14 and 16 are shown, but commercial deployments are expected to have substantially more, for instance, exceeding 10,000, and in many cases exceeding 10 million user computing devices, often with more than 1 million user accounts, each having multiple computing devices registered thereto. In some embodiments, the authentication system 12 may experience a relatively large number of concurrent authentication and registration sessions, for instance, more than 10, and in many cases, more than 100 concurrent authentication or registration sessions in which a corresponding user engages in an authentication or a registration process.

In part due to this concurrency, particularly during registration processes, it can be difficult to match communications from devices being registered to an ongoing session in which it the user requests via another computing device to register a device in their possession. For instance, within seconds, two users may each request with their laptop to register their respective mobile phones as a second factor in a 2fa protocol, and both may be sent a registration code (e.g. a 3 to 12 digit alphanumeric code that is short enough that a user can enter the code by typing it into the device to be registered within less than 30 seconds). In this scenario, both users may have received a registration code before the other enters it into the device to be registered. In some embodiments, the authentication system may receive two communications from the two different devices being registered, the communications identifying the device as one that is to be registered. In this scenario, without the registration code, it can be difficult to determine which session corresponds to the device that sent the communication, which could cause one user's mobile phone to be registered as a second factor for the other user's account and vice versa. To mitigate this risk, some embodiments use the registration code as a session identifier, and communications from the second computing device are matched to a session with the registration code sent by the second computing device, such as the mobile computing device 16.

Session identifiers used in other computing contexts are often not well-suited to this use case, as in many cases, session identifiers are relatively long alphanumeric strings, for instance, exceeding 63 characters, that are computer-generated and never seen or entered into a user interface by the user. These relatively long session identifiers are often longer than what a user is willing to type into, or otherwise enter into, a second computing device to register that computing device. Thus, shorter registration codes are often used. These relatively short codes, however, give rise to the types of brute force attacks discussed above, which may be mitigated by some embodiments of the present system, which afford some or all of the benefits of relatively short registration codes while mitigating the risk of brute force attacks. That said, embodiments are not limited to systems that afford this benefit, as various engineering and cost tradeoffs may result in the present techniques yielding other benefits at the expense of this one.

In some embodiments, the user computing devices 14 and 16 may both be in the possession of a user seeking to configure a user account that is either partially or fully created on the authentication system 12. In some embodiments, the user computing devices 14 and 16 are co-located, both in the possession of a single user corresponding to a single account. In some cases, the user computing devices 14 and 16 both communicate with the Internet 20 via the same local area network, such as a wireless area network, or in some cases, the devices 14 and 16 connect to the Internet 20 via other networks, such as one being on a local area network and the other being on a cellular network.

In some embodiments, user computing device 14 is a mobile computing device, a non-mobile computing device, an Internet appliance, a set-top box, a tablet computer, a kiosk, a wearable computing device, or the like. In some embodiments, the user computing device 14 may execute a special purpose application or a browser accessing a web application by which a user accesses the user account and configures the user's account, for instance, to register other computing devices, like the user mobile computing device 16 to serve various roles with respect to that account. In some cases, the user computing device 14 is not configured to communicate directly with the user mobile computing device 16, for instance, lacking a network address of the other computing device 16 in memory, and vice versa. In some cases, many users are not sufficiently skilled to establish a direct network connection between the user computing device 14 and the mobile computing device 16, particularly when they both access the Internet 20 through different networks. Or in some embodiments, the two devices 14 and 16 may establish a direct connection, such as via Bluetooth™, near-field communication (NFC), QR code displayed on screens and read by cameras, audible codes transmitted with speakers and received by microphones, or via a shared local area network. In some cases, the registration code described below and the authentication codes described below may be transmitted from one device to the other via a direct connection, or some embodiments lacking this direct connection may be implemented by a user typing these codes into a different device from the device that presents the code to the user.

The user mobile computing device 16 is described as a mobile device in this example, but may be any of a variety of other types of computing devices the user wishes to pair with the computing device 14, including the types of computing devices described above as embodying device 14. In some cases, one or both of these devices 14 and 16 may be an embedded system, such as an Internet-of-things appliance. Examples include smart thermostats, hubs for zigBee™ networks, smart lightbulbs, smart refrigerators, smart washing machines, smart dryers, smart dishwashers, smart ovens, smart door locks, smart window blinds, smart air vents, smart televisions, game consoles, media players, or other computing devices having a processor and, in some cases, executing an operating system configured to control an appliance in the user's home or workplace.

In some embodiments, the application servers 18 are various types of network accessible resources, such as Web servers or API servers. In some embodiments, applications servers 18 are servers by which a user accesses one of a variety of different types of software-as-a-service applications, such as those described below with reference to FIG. 4. In some cases, the authentication system 12 may authenticate users to access resources hosted by the application servers 18 on behalf of entities operating application servers 18, so that user credentials need not be provided to, stored by, or otherwise accessible by the application servers 18, thereby reducing an attack surface by which such credentials can be leaked. In some cases, the authentication system 12, upon authenticating a user, may return to the user computing device a uniform resource identifier (URI) of a corresponding application server 18 to which the user seeks access, for instance, in the form of a redirect command. In some embodiments, a token with a cryptographic code may be appended to the end of the URI, and the token may be sent to the corresponding application server 18 upon a user's computing device following the redirect command, for instance with a web browser requesting content at the URI with the token. In some cases, the token assigned with a private key of the authentication system, and the receiving application server may determine based on a public key of the authentication system that the received token is authentic before granting a user access to hosted resources.

In some cases, the Internet 20 connects to the various devices described herein via various other networks, for instance, local area networks, wireless area networks, and the like.

In some embodiments, the authentication system 12 is hosted by one or more computers, for instance, within a data center or a plurality of data centers. In some embodiments, the components described may be replicated in multiple instances, for instance, behind load balancers, to service a relatively large number of concurrent sessions. In some cases, some of the described functionality may be implemented by accessing an application program interface (API) of a third-party server, in which case references to performing a particular function may be performed by calling that API and then (in some cases) receiving a response from the API. In some embodiments, the authentication system 12 includes an API server 22, a Web server 24, a controller 26, a registrar 28, a session state repository 30, a user account repository 32, and an authenticator 34.

In some embodiments, the API server 22 and Web server 24 may be nonblocking servers configured to service a relatively large number of concurrent sessions, for instance, with communications arriving at a relatively high rate, like more than 50 per second. In some embodiments, the API server 22 may be configured to receive and send various exchanges through an API protocol, for instance a representational state transfer (REST)-based protocol by which a native application executing on the user computing devices 14 and 16 exchanges instructions with the authentication system 12 (e.g., commands or data that results in execution of various operations). In some embodiments, the Web server 24 may serve web content to a browser executing on one or more of the user computing devices 14 or 16. In some cases, different parts of a registration or authentication session may use both a web browser and a special-purpose application, like a native mobile application, executing on the user computing devices 14 and 16. For instance, some embodiments may provide a webpage in which a user requests registration or request authentication to a web browser executing on device 14, and some embodiments may receive a registration code from a native application executing on the user computing device 16, before providing or receiving an authentication code via a native application executing on the user computing device 16. Thus, in some cases, both the API server 22 and the Web server 24 may participate in the same session, or some embodiments may implement an entire session with one or the other.

In some embodiments, the controller 26 may coordinate the operation of the other components of the authentication system 12, in some cases executing portions of the routine described below with reference to FIG. 2 performed by the authentication system 12. For instance, controller 26 may include a plurality of different functions called by the API server 22 or the Web server 24 upon receiving a communication that implicates that function. In some cases, those functions may coordinate various operations of the other components to perform a responsive action.

In some embodiments, the registrar 28 is configured to register computing devices to user accounts. In some cases, the registrar 28 is configured to register a second computing device to an existing user account, for instance, as a second factor in a multifactor authentication protocol by which the user submits a password and then submits a code that demonstrates possession of a second computing device. Or some embodiments may register Internet-of-things appliances or other embedded systems to a user's account. In some cases, the user account may be pre-existing, for instance, formed more than an hour or day in advance of registration. Or in some cases, registration may occur when setting up the account. In some embodiments, the registrar 28 may be configured to cause various communications by which submitted registration codes are confirmed to have been submitted by trusted client-side applications, rather than an attacker script making brute force submissions, as described below with reference to FIG. 2.

In some embodiments, the authenticator 34 may be configured to authenticate users or devices to access various resources, for instance, by validating that a user is able to submit both a password and demonstrate possession of a second computing device in a two-factor authentication protocol. Upon the user satisfying both factors, some embodiments may execute the operations described above by which an authentication token is formed and sent to effectuate access to various third-party application servers or various other computing devices, such as a ZigBee™ hub configured to control Internet-of-things appliances and the user's home or workplace.

In some embodiments, the session state repository 30 may store records of previous or ongoing sessions, such as registration sessions or authentication sessions. During registration sessions, some embodiments may determine whether to add, and in some cases add, additional computing devices to a user account. And during an authentication session, some embodiments may determine whether to authenticate a user based on user submitted credentials. As noted, in many cases, such sessions may occur in a plurality of back-and-forth exchanges with one or more client devices (e.g., the user computing devices 14 and 16) over time and in some cases across devices. Some embodiments may store information about a session state in a corresponding session state record, such that subsequent exchanges may be matched to that record and the record, then, used to determine a current state of a session and subsequent operations. For example, a registration state record may include a session identifier, an indication of whether a registration code has been sent, an indication of the registration code, an indication of whether the registration code has been received from another computing device, and a result of a determination of whether the registration code received from the other computing device was received from a trusted application executing thereon.

The user account repository 32 may include a plurality of user account records, each record including a user identifier, an authentication credential (like a password), and identifiers of registered computing devices, such as registered computing devices designated to serve as second or third supplemental factors (that is supplementing the password) in authentication determinations. In some cases, the identifier is a device identifier like a universal device identifier (UDI) assigned by an operating system, a medium access control (MAC) address assigned by a maker of a network interface, or an application-specific identifier assigned by the trusted application described below. In some cases, the device identifier may be associated with a network address and network port at which the trusted application (like the designated application described below) is configured to receive network communications. In some embodiments, this association may be stored and accessed by a third-party, such as by a provider of an operating system of the second computing device, or by a third party hosting a push notification service to which the trusted application subscribes to receive push notifications. Often, computing devices do not have persistent Internet Protocol addresses, particularly mobile computing devices, so implementing push notifications can be challenging, as there is often no way to determine which addressed to send communications to without first receiving a request, as occurs during pull messaging in which the device sends a request for the message, with the request including an address of the device to which the message can be sent (e.g., in a header of a transmission control protocol (TCP) packet). In some cases, applications executing on computing devices may subscribe to receive push requests in advance of a push request, and those client devices may periodically send a current network address to a service through which push requests are routed or by which push requests are resolved to a network address. Examples include the Firebase™ service of Google Inc. of Mountain View, Calif. and Apple Push Notification service of Apple, Inc. of Cupertino, Calif.

In some embodiments, the user mobile computing device 16 may include a designated application 36 and a cryptographic key 38 by which the submission of a registration code is determined to have come from a trusted application, rather than from an attacker's script. In some cases, the designated application is a special-purpose native application executing on the mobile computing device 16, for instance, upon being downloaded from an application repository hosted by a provider of an operating system of the mobile computing device 16. In some cases, the designated application may be provided by an entity operating the authentication system 12. Accordingly, references to a "medium," singular, herein should be read to encompass implementations with a distributed medium (e.g., where some of the instructions stored by the medium are stored in memory of a mobile computing device, or in memory of a server of a provider of native applications to computing devices, and other instructions are stored by the medium are stored in memory of the authentication system 12, for instance, with different instructions in different memories of different computers in a data center).

In some embodiments, the designated application is configured to perform the operations described below with reference to FIG. 2 as being attributable to the designated application. In some embodiments, the designated application is configured to present a user interface, such as on a display screen of the device 16, having a user input, like a text box input, in which the user may enter a registration code that was sent to the user via the computing device 14, for instance, in a webpage rendered in a browser of user computing device 14. In some embodiments, the user interface of the designated application 36 may include a submit input by which a user instructs the mobile computing device 16 to submit a fully entered registration code and a corresponding event handler that causes the registration code to be sent to the authentication system 12.

In some cases, the designated application may subscribe to push notifications via one of the above-describe services and monitor a port of the user computing device 16 designated for the application (which includes a port for push notifications generally), which may be different from ports used for web browsing and various other applications, in some cases. In some embodiments, the designated application may include an event handler that receives instruction sent to that port (for instance, through push notifications) and takes responsive action. In some embodiments, some push notifications may be sent after submitting a registration code to the mobile computing device 16 that sent the registration code, and the push notification may include instructions to demonstrate that the submitting application is not an attacker's script.

To this end, some embodiments of the designated application, via the corresponding event handler, may demonstrate access to a cryptographic key 38. The cryptographic key 38 may be stored in a manner that impedes or prevents access by other applications executing on the user computing device 16. In some cases, the cryptographic key may be a private key in an asymmetric encryption protocol, for instance, with a (e.g., uniquely) corresponding public key stored by the authentication system 12 and used to confirm communication signed by the private key were sent by a computing device and application with access to the private key. In some cases, the cryptographic key may be a random, relatively high-entropy (e.g., greater than 16 characters long, selected from a character set of greater than 256 characters)

string. For instance, such a string may be determined by the designated application upon installation and sent to the authentication system 12 during installation of the designated application, or assigned to the designated application by the authentication system 12, e.g., during installation of the designated application 36 and sent to the designated application 36 by the authentication system 12. In some cases, the string may be stored by the authentication system 12, for instance, for use in a symmetric key encryption protocol.

In some cases, other applications executing on the user computing device 16 may be prevented or impeded from accessing the cryptographic key with a variety of techniques. In some embodiments, a kernel of an operating system of the device 16 may assign a process identifier to the designated application and reserve space in an address space of memory of the mobile computing device 16 for access exclusively by the application having that identifier, thereby preventing or impeding higher levels of the mobile computing device's software stack from accessing the cryptographic key 38 stored in the reserved space.

In some embodiments, the cryptographic key 38 may be stored in a trusted execution environment of the computing device 16 and accessed via the trusted execution environment. For example, some embodiments of the authentication system 12 may include a first physical processor that executes the operating system (or set of processors) and the various applications including the designated application executed therein, and a second processor (such as a coprocessor) that executes the trusted execution environment, such as a secure enclave. For instance, the trusted execution environment may be executed within a different memory address space, on a different memory bus, from the other processor (or processors) executing the operating system of the mobile computing device 16. In some cases, a plurality of registers or other buffers may be accessible by the two sets of processors, and the trusted execution environment may communicate with the other processors via the registers or buffers, in some cases, with an interrupt handler executed in the trusted execution environment that responds to changes to values in the registers or buffers by executing corresponding routines in the trusted executing environment. In some cases, the cryptographic key 38 may be stored in the trusted execution environment, or a key in a keychain including the cryptographic key 38 may be stored in the trusted execution environment (e.g., a key used to unlock an encryption key that is used to unlock an encrypted version of the cryptographic key 38).

In some embodiments, the designated application 36 may send a value that demonstrates access to the cryptographic key 38 without sending the cryptographic key 38 itself. For instance, some embodiments may digitally sign a message with the cryptographic key 38, e.g., using an asymmetric public key encryption protocol, and the authentication system 12 may determine that the digital signature was made by a computing device and application with access to the private key based on a corresponding public key stored by the authentication system 12 (e.g., uniquely corresponding to the private key used in the signature and different from public keys of other instances of the designated application 36 executing on other computing devices). In another example, some embodiments may combine a string (e.g., a predetermined string of more than 10 characters) with a cryptographic key using a symmetric encryption protocol, for instance by XOR'ing a previously agreed-upon string with the key. In this example, the authentication system 12 may reverse the XOR operation with the stored version of the same key to determine whether the result is the previously agreed-upon string, indicating access to the key.

In some cases, the designated application 16 may send a value indicating that the designated application 16 itself has not been modified. For example, some embodiments of the designated application 16 may access binary values encoding the designated application in memory of the computing device 16, for instance, stored in persistent memory and from which a executing instance is launched. In some cases, these binary values may encode machine code, byte code, or source code, e.g., with some of the code being stored in encrypted form to impede efforts to inspect the code by an attacker. Some embodiments may input the stored code into a hash function and output a hash value based on the stored code. Some embodiments may send this resulting hash value with the value demonstrating access to the cryptographic key to the system 12, and some embodiments of the authentication system 12 may determine whether to register the second computing device both based on the second computing device demonstrating access to the cryptographic key 38 and based on the hash value indicating an unmodified copy of the code of the designated application 16 being stored by the computing device 16. In some cases, the authentication system 12 may store in memory a hash value calculated on a known unadulterated copy of the designated application 12 and compare that stored hash value with the received hash value to determine that they match and that the code is likely unmodified on the user mobile computing device 16.

In some embodiments, the designated application executes a background process that receives the push message with the instructions to send proof of access to the cryptographic key, such that the user is not alerted to the operation, e.g., no updates are displayed in a display screen of the mobile computing device 16 during receipt of the instructions or during execution of the instructions that indicate the push message was received or that a response is being prepared and sent. This is expected to make it more difficult for an attacker to detect that the verification process is occurring and identify the process as one that needs to be attacked. Further, because a push message is used in some cases, the designated application may need to have been previously installed and other systems configured so that the designated application subscribes to push messages, thereby imposing further constraints on attacker's scripts. That said, not all embodiments provide these benefits, and some embodiments may be implemented with other techniques, for instance, with pull messaging or with messages demonstrating access to the cryptographic key being sent with the registration code, for instance, in a single transmission to the system 12.

Figure 2:
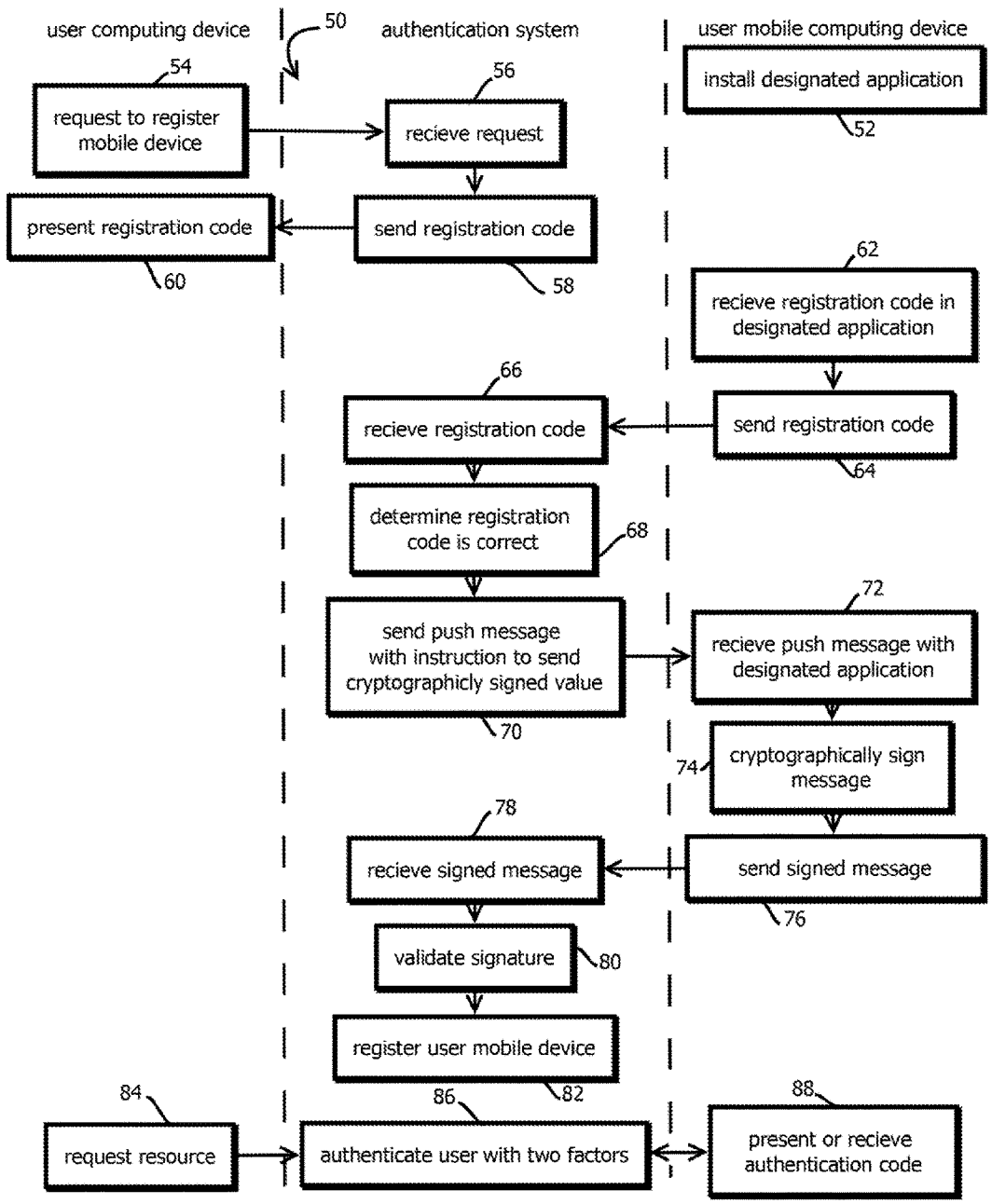
FIG. 2 is a flowchart of an example of a process to register a user computing device with the authentication system of FIG. 1 in accordance with some embodiments.

FIG. 2 shows an example of a process to register a second computing device and authenticate a user with the second computing device. The illustrated process 50 may be performed by the computing environment 10 of FIG. 1 or with other systems. In some embodiments, the operations described may be performed concurrently by a plurality of different computing devices, and in some cases, the operations described may be performed in a different order, with additional operations, or with some operations omitted, which is not to suggest that any other feature described herein is not also amenable to variation.

In some embodiments, the process 50 begins with a user mobile computing device (or other device that is registered later in the process) having a designated application installed, as indicated by block 52. In some cases, the designated application may be installed before the other operations described. In some cases, the designated application may be installed by a manufacturer of the computing device to be registered, for instance, by a maker of an embedded system, or in some cases, the application may be installed by downloading the application from a repository of applications hosted by a provider of an operating system of the mobile computing device. In some cases, installing the application includes storing in memory accessible to the application the above-described cryptographic key 38 used to demonstrate authenticity.

Next, some embodiments include the user computing device requesting to register the mobile device, as indicated by block 54. (Again, a mobile computing device for the registered device is used as an example, but embodiments are consistent with a variety of other computing devices serving as the computing device being registered). In some cases, the user computing device 14 may be navigated to a user account configuration webpage, and the user may submit the request to register the mobile device to the authentication system 12, which may receive the request, as indicated by block 56.

Next, the authentication system may send a registration code, as indicated by block 58, back to the user computing device 14, i.e., to a different computing device from the computing device that is to be registered, in this example. In some cases, the registered code may be an alphanumeric code of between three and twelve characters. In some cases, the registered code may be generated with a linear shift register configured to output nonrepeating instances of the registered code until an entire namespace of the registered code is used, without doing so in a fashion that indicates a likely next code to be selected. Or some embodiments may execute a routine by which codes in a namespace of the registration code are shuffled periodically, for instance, by assigning a random value and then sorting according to the random value, and embodiments may increment through positions in this randomized list to select the next registration code. Again, this is expected to impede efforts by an attacker to guess subsequent registration codes.

In some embodiments, the user computing device 14 may present a registration code, for instance, on a display screen, as indicated by block 60. In some cases, the registration code may be presented visually within a web browser, for instance, in human readable text. Or some embodiments may present a registration code with other techniques, for instance, audibly. In some cases, the registration code may be presented in a machine-readable format, for instance, in a QR code displayed on a display screen of the user computing device, and audible code, or a wireless transmission, such as via Bluetooth™, NFC, or Wi-Fi Direct™, each producing a wireless signal that may be perceived by a corresponding sensor or radio of the mobile computing device. In some of these examples, the registration code may be substantially longer than the human-entered codes described above.

Next, the mobile computing device 16 may receive the registration code in the designated application that was previously installed, as indicated by block 62. As noted, in some cases, the registration code may be typed in by the user, or some embodiments may directly wirelessly transmit the registration code from the user computing device 14 to the mobile computing device 16, for instance, without leaving a local wireless area network, or without sending the code to the authentication system in the course of transmitting, e.g., from device 14 to device 16 in FIG. 1.

Next, the designated application may send the registration code, as indicated by block 64, to the authentication system, which may receive the registration code, as indicated by block 66. In some cases, the registration code may be salted, encrypted, transmitted, received, decrypted, and the salt parsed from the registration code by the authentication system. In some cases, the registration code may be sent with a device identifier of the mobile computing device, such as one of the examples described above for uniquely identifying the mobile computing device upon registration for use in authentication or otherwise providing access.

Next, the authentication system may determine whether the registration code is correct, as indicated by block 68. Some embodiments may query the registration records in the session state repository 30 (of FIG. 1) for session state records indicating an ongoing session in which a registration code was previously sent, for instance, within a threshold duration of time. Some embodiments may interrogate the responsive records to identify a record including the received registration code, thereby uniquely identifying a session including the device that made the request in block 54 and distinguishing other devices sending the same type of request around the same time. Upon determining that no session records have a registration code that matches, some embodiments may terminate the process 50 and send a message to the mobile computing device instructing the device to indicate to the user that the registration code was incorrect.

Upon determining that the registration code is correct, some embodiments may proceed to determine whether the registration code was submitted by a trusted application, such the designated application having access to the cryptographic key, for instance, an unmodified version of that application. To this end, some embodiments may send a push message with instructions to send a cryptographically signed value, as indicated by block 70 to the mobile computing device. The mobile computing device may receive the push message with the designated application, as indicated by block 72. In some cases, the sent push message may be routed through a push messaging service to which the designated application subscribes, e.g., by providing in advance a network address, or the push message may be sent to a persistent network address. In some cases, the push messaging service may be queried for a current address to which to send the push message. (Or as noted above, some embodiments are consistent with pull messaging, in which the mobile computing device request the instructions with a network transmission that identifies its address or sends the requested value without the value being requested).

Next, some embodiments may cryptographically sign a message, such as a previously agreed-upon string, with a private key or a symmetric key to form the cryptographically signed value, as indicated by block 74. Some embodiments may then send the signed value, as indicated by block 76, to the authentication system, which may receive the signed message, as indicated by block 78.

Upon receiving the signed message, some embodiments may validate the signature, as indicated by block 80. Validating the signed signature may include determining that the message was signed by an entity with access to a private key by using a corresponding public key stored in memory of the system 12. Or some embodiments may retrieve from memory a symmetric key associated in memory with a device identifier of the instance of the designated application installed on the device 16, and that identifier may be sent with the signed message. Some embodiments may then decrypt the message with the symmetric key to confirm that the previously agreed-upon string is the result. Upon determining of the signature is not valid, some embodiments may terminate the process 50 and send the message back to the mobile computing device 16 or to the computing device 14 described above, indicating the failure.

Some embodiments may rate limit submissions of registration codes to further impede brute force attacks. For instance, some embodiments may determine whether the device identifier of the device 16 (using the various forms of identifiers described above) is associated with more than a threshold amount of logged registration code submissions stored in memory during a trailing duration of time (like more than three in the last hour). Some embodiments may determine whether a cryptographic key has been associated with a sent message more than a threshold amount of times during a trailing duration of time. Upon determining that such thresholds have been exceeded, some embodiments may terminate the process 50 and send a message (e.g., computer readable, human readable, or both) indicating the failure, like those described above to the devices 14 or 16 or both.

Some embodiments may implement additional techniques to further impede brute force attacks. For example, some embodiments may send a proof of work task to the user mobile computing device, such as a task that requires the user mobile computing device to factor a relatively large number or determine a nonce that when appended to a string produces a hash value with certain properties, like more than a threshold amount of zeros in a prefix or suffix of the hash value. In some cases, the mobile computing device may send a solution to the task to the authentication system, and the authentication system may determine whether to register the mobile device based on whether the solution is a valid solution. These types of tasks are expected to slow the rate at which an adversary guesses and submits registration codes.

Upon determining that the signature is valid and other criteria are satisfied, some embodiments may register the user mobile device, as indicated by block 82, for instance, by updating one of the user account records described above.

Next, some embodiments may use the registration, for instance, by providing the registered computing device with access to various resources associated with a user account, like in an Internet-of-things hosted account or a local account serviced by a hub controlling a variety of embedded systems in the user's home or workplace.

In the illustrated example, the registered computing device 16 may be used as a second factor to authenticate the user in a multi-factor authentication protocol. For example, using the computing device 14, or some other computing device, the user may request a resource, as indicated by block 84, for instance, from one of the above-described application servers 18. In some cases, the application server 18 may send a URI that causes the computing device 14 to retrieve an authentication interface from the authentication system 12, which may result in the request of block 84.

In some embodiments, the authentication system 12 may receive the request and authenticate the user with two factors, as indicated by block 86. In some cases, this operation may include sending instructions to present a user interface back to the requesting device of block 84, e.g., an interface with a user input by which the user may enter a password or some other authentication credential serving as a first factor in the multifactor authentication protocol. This user-entered value may be sent to the system 12, which may determine based on a corresponding user account (identified with a user identifier sent with the first factor) whether the first authentication credential is correct, for example, exactly matches a stored password. Some embodiments may then present or receive an authentication code, as indicated by block 88.

Then, some embodiments may execute a routine by which the user demonstrates possession of the registered computing device. For example, some embodiments may retrieve from the user account identified based on the user identifier a device identifier of the registered computing device. Some embodiments may send the registered computing device a push message with an authentication code, for instance, to the designated application. In some cases, this authentication code may be generated with techniques like those described above for generating the registration code, and the authentication code may be displayed on the registered computing device. The authentication code may be displayed with instructions to enter the authentication code in the requesting computing device user interface, for instance, in a text box user input configured to receive the authentication code. In some cases, the user may type the authentication code into this user input on the requesting device of block 84. The user interface may cause the authentication code to be submitted to the system 12, for instance, upon the user selecting a submit input button. In some cases, the system 12 may receive this authentication code and compare the authentication code to an authentication code sent to the registered device. Upon determining a match, some embodiments may determine that the user is authenticated and has demonstrated possession of the registered device. In response, some embodiments may grant (or send an authentication token that affords) access to various resources, such as a hosted SaaS account.

Alternatively, some embodiments may reverse the direction of flow of the authentication code. Some embodiments may send the authentication code to the requesting device of block 84 with instructions to enter the authentication code in the designated application of the mobile computing device that was registered of in the above-described process. Some embodiments may then receive the authentication code from the registered device at the authentication system and perform a comparison like that described above to determine whether to authenticate the user.

In some embodiments, upon determining that the authentication code does not match, some embodiments may determine that the user failed to satisfy the second factor and decline to authenticate the user, in some cases, also sending an indication of the failure to one or both of the requesting device and the registered device.

Rather than having the user type the authentication code, some embodiments may transmit the authentication code between the registered device and the requesting device of block 84 through machine-to-machine communication, for instance, with the various wireless local area network transmission techniques described above, and the receiving device may then send the authentication code back to the system 12, thereby indicating that the person operating the requesting device of block 84 is in possession of the registered device.

In some embodiments, the above techniques may be used in an identity management system, like that described below with reference to FIG. 3, but it should be appreciated that these techniques are useful in a variety of different other use cases, only some examples of which are described above.

Figure 3:
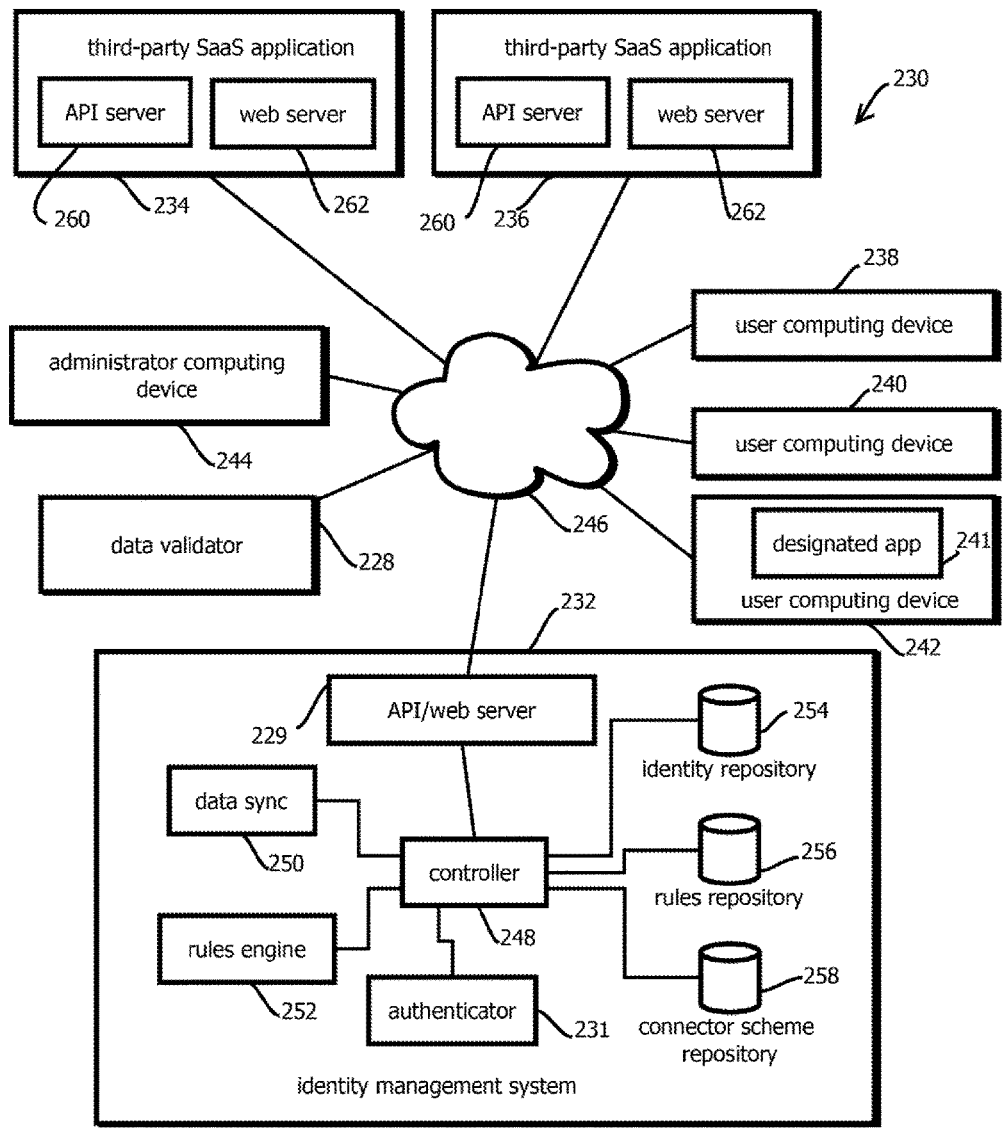
FIG. 3 is an example of an identity management system in which the authentication system and process of FIGS. 1 and 2 may be implemented in accordance with some embodiments.

FIG. 3 is a block diagram of a computing environment 230 in which the above-describe techniques may be implemented, though it should be emphasized that this is one example of a variety of different systems that are expected benefit from the presently described techniques.

As enterprises move their applications to the cloud, and in particular to SaaS applications provided by third parties, it can become very burdensome and complex to manage roles and permissions of employees. For example, a given business may have 20 different subscriptions to 20 different SaaS offerings (like web-based email, customer resource management systems, enterprise resource planning systems, document management systems, and the like). And that business may have 50,000 employees with varying responsibilities in the organization, with employees coming and going and changing roles regularly. Generally, the business would seek to tightly control which employees can access which SaaS services, and often which features of those services each employee can access. For instance, a manager may have permission to add or delete a defect-tracking ticket, while a lower-level employee may only be allowed to add notes or advance state of the ticket in a workflow. Or certain employees may have elevated access to certain email accounts or sensitive human resources related documents. Each time an employee arrives, leaves, or changes roles, different sets of SaaS user accounts may need to be added, deleted, or updated. Thus, many businesses are facing a crisis of complexity, as they attempt to manage roles in permissions across a relatively large organization using a relatively large number of SaaS services with relatively fine-grained feature-access controls.

These issues may be mitigated by some embodiments of the computing environment 230, which includes an identity management system 232 that manages roles and permissions on a plurality of different third-party SaaS applications 234 and 236. In some cases, the SaaS applications may be accessed by users having accounts and various roles, subject to various permissions, on user computing devices 238, 240, or 242, and those accounts may be managed by an administrator operating administrator computing device 244. In some cases, the user computing devices and administrator computing device may be computing devices operated by a single entity, such as a single entity within a single local area network or domain. Or in some cases, the user computing devices 238, 240, and 242 may be distributed among a plurality of different local area networks, for instance, within an organization having multiple networks. In the figure, the number of third-party application servers and user computing devices is two and three respectively, but it should be appreciated that commercial use cases are expected to involve substantially more instances of such devices. Expected use cases involve more than 10 third-party SaaS applications, and in many cases more than 20 or 50 third-party SaaS applications or on-premises applications. Similarly, expected use cases involve more than 1,000 user computing devices, and in many cases more than 10,000 or more than 50,000 user computing devices. In some cases, the number of users is expected to scale similarly, in some cases, with users transitioning into new roles at a rate exceeding 10 per day, and in many commercially relevant use cases, exceeding 100 or 1,000 per day on average. Similarly, versioning of third-party APIs and addition or subtraction of third-party APIs is expected to result in new APIs or new versions of APIs being added monthly or more often in some use cases.

In some embodiments, the user computing devices 238, 240, and 242 may be operated by users accessing or seeking access to the third-party SaaS applications, and administrator computing device 244 may be operated by a system administrator that manages that access. In some embodiments, such management may be facilitated with the identity management system 232, which in some cases, may automatically create, delete, or modify user accounts on various subsets or all of the third-party SaaS applications in response to users being added to, removed from, or moved between, roles in an organization. In some embodiments, each role may be mapped to a plurality of account configurations for the third-party SaaS applications. In some embodiments, in response to a user changing roles, the administrator may indicate that change in roles via the administrator computing device 244, in a transmission to the identity management system 232.

In response to this transmission, the identity management system may retrieve from memory and updated set of account configurations for the user in the new role, and records of these new account configurations may be created in a graph database in the identity management system 232. That graph database and the corresponding records may be synchronized with corresponding third-party applications 234 and 236 to implement the new account configurations. Further, in some cases, a new deployment of the identity management system 232 may contain a graph database populated initially by extracting data from the third-party SaaS applications and translating that data into a canonical format suitable for the graph database. In some embodiments, the third-party SaaS applications may include an API server 260 and a web server 262.

In some embodiments, the computing environment 230 includes a data validator 228 that validates data according to diverse data schemas. In some cases, the data validator includes a document database storing diverse schemas, a schema formation module that performs a process form schemas, including a schema crawler configured to recursively crawl through a set of linked schemas, and modules that combine criteria from the schemas. In some cases, the data validator 228 may validate data entering the identity repository 254 of the identity management system 232.

In some embodiments, the identity management system 232 may include a web/API server 229. In some embodiments, the server 229 may receiving in-bound or out-bound data, identify a corresponding document specifying how to translate between API formats (or constitute the document via references expressing inheritance and polymorphism), and perform a process to translate data between external data schemas and an internal data schema of the identity repository 254.

In some embodiments, each of the third-party SaaS applications are at different domains, having different subnetworks, at different geographic locations, and are operated by different entities. In some embodiments, a single entity may operate multiple third-party SaaS applications, for instance, at a shared data center, or in some cases, a different third-party may host the third-party SaaS applications on behalf of multiple other third parties. In some embodiments, the third-party SaaS applications may be geographically and logically remote from the identity management system 232 and each of the computing devices 238, 240, 242, and 244. In some embodiments, these components 232 through 242 may communicate with one another via various networks, including the Internet 246 and various local area networks.

In some embodiments, the identity management system 232 includes a controller 248, an authenticator 231, a data synchronization module 250, a rules engine 252, and identity repository 254, a rules repository 256, and a connector schema repository 258. In some embodiments, the controller 248 may direct the operations described above, in some cases by communicating with the various other modules of the identity management system and the other components of the computing environment 230. In some embodiments, the data synchronization module 250 may be configured to synchronize records in the identity repository 254 with records in the third-party SaaS applications, for instance by translating those records at the direction of the controller 248. For instance, a user may transfer into a sales group at a company, and the rules may indicate that in the new role, the user is be given a SaaS customer-relationship management account, and that account is to be added in the SaaS application to a group corresponding to a geographic sales region. These may lead to sequential tasks, where the account needs to be created via the API, before the API can be commanded to add the account to a group.

In some embodiments, the identity management system 232 may include an authenticator 231 configured to execute the routines described above. In some cases, the user computing device 240 may serve as the first computing device, and the user computing device 242 may serve as the second user computing device in the routine above, e.g., as the device being registered or used as a second factor in a 2fa protocol. In some embodiments, the second user computing device may have installed thereon a designated application 241, such as an application that executes as a background process and is configured to perform the operations described above.

In some embodiments, the rules engine 252 may be configured to update the identity repository 254 based on rules in the rules repository 256 to determine third-party SaaS application account configurations based on changes in roles of users, for instance received from the administrator computing device 244, at the direction of controller 248. In some embodiments, the administrator computing device 244 may send a command to transition a user from a first role to a second role, for instance, a command indicating the user has moved from a first-level technical support position to a management position. In response, the controller 248 may retrieve a set of rules (which may also be referred to as a "policy") corresponding to the former position and a set of rules corresponding to the new position from the rules repository 246. In some embodiments, these sets of rules may indicate which SaaS applications should have accounts for the corresponding user/role and configurations of those accounts, like permissions and features to enable or disable. In some embodiments, these rules may be sent to the rules engine 252, which may compare the rules to determine differences from a current state, for instance, configurations to change or accounts to add or remove. In some embodiments, the rules engine 252 may update records in the identity repository 254 to indicate those changes, for instance, removing accounts, changing groups to which users belong, changing permissions, adding accounts, removing users from groups, and the like. In some cases, applying the rules may be an example of unordered tasks performed by the system. In some embodiments, these updates may be updates to a graph data structure. In some embodiments, the graph data structure may be a neo4j graph database available from Neo Technology, Inc. of San Mateo, Calif. In some embodiments, the controller 248 may respond to these updates by instructing the data sync module 252 translate the modified nodes and edges into API commands and sending those API commands to the corresponding third-party SaaS applications.

In some embodiments, the identity repository 254 may include a graph data structure indicating various entities and relationships between those entities that describe user accounts, user roles within an organization, and the third-party SaaS applications. For instance, some embodiments may record as entities in the graph data structure the third-party SaaS applications, accounts of those applications, groups of user accounts (in some cases in a hierarchical taxonomy), groups of users in an organization (again, in some cases in a hierarchical taxonomy, like an organizational structure), user accounts, and users. Each of these nodes may have a variety of attributes, e.g., user names for user accounts, user identifiers for users, group names, and group leaders for groups, and the like. In some embodiments, the graph data structure may be a neo4j graph database available from Neo Technology, Inc. of San Mateo, Calif.

In some embodiments, these nodes may be related to one another through various relationships that may be encoded as edges of the graph. For instance, an edge may indicate that a user is a member of a subgroup, and that that subgroup is a member of a group of subgroups. Similarly, and edge may indicate that a user has an account, and that the account is a member of a group of accounts, like a distribution list. In some examples, and edge may indicate that an account is with a SaaS application, with the respective edge linking between a node corresponding to the particular account and another node corresponding to the SaaS application. In some embodiments, multiple SaaS applications may be linked by edges to a node corresponding to a given party, such as a third-party.

In some embodiments, this data structure is expected to afford relatively fast operation by computing systems for certain operations expected to be performed relatively frequently by the identity management system 232. For instance, some embodiments may be configured to relatively quickly query all accounts of the user by requesting all edges of the type "has_an_account" connected to the node corresponding to the user, with those edges identifying the nodes corresponding to the respective accounts. In another example, all members of a group may be retrieved relatively quickly by requesting all nodes connected to a node correspond to the group by an edge that indicates membership. Thus, the graph data structure may afford relatively fast operation compared to many traditional systems based on relational databases in which such relationships are evaluated by cumbersome join operations extending across several tables or by maintaining redundant indexes that slow updates. (Though, embodiments are also consistent with use of relational databases instead of graph databases, as multiple, independently useful techniques are described).

Figure 4:
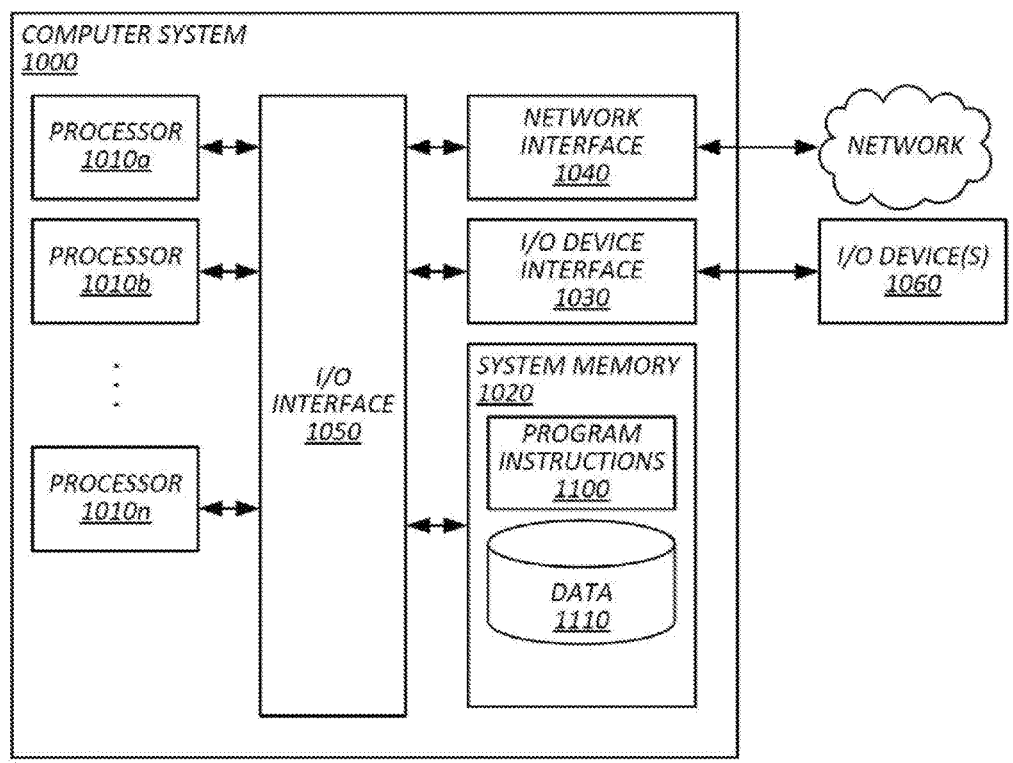
FIG. 4 is an example of a computer system by which the above processes and systems may be implemented in accordance with some embodiments.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:
1. A tangible, non-transitory, machine-readable medium storing instructions that when executed by one or more processors effectuate operations comprising: receiving, via a network, a request from a first computing device to register another computing device: as a supplemental factor in a multi-factor authentication protocol, or as an embedded system authorized to access a distributed computing application; after receiving the request, sending to the first computing device, via a network, a registration code to be entered in a designated application executing on another computing device to demonstrate possession of the other computing device to be registered; after sending the registration code to the first computing device, receiving the registration code, via a network, from a second computing device; sending an instruction to the designated application executing on the second computing device instructing the designated application to send a value indicative of access to a cryptographic key stored in memory of the second computing device, wherein cryptographic key is stored in a location or format accessible to the designated application but not to other untrusted applications executing on the second computing device; receiving, via the network, from the designated application executing on the second computing device, the value indicative of access to the cryptographic key; determining, based on the received value and a reference value stored in memory that the received registration code was sent by the designated application and not another untrusted application executing on the second computing device; and based on the determination, registering in memory the second computing device as the supplemental factor or as authorized to access the distributed computing application.
2. The medium of embodiment 1, wherein the determination is configured to impede brute force attacks on computing device registration by impairing an attacker's ability to use an attacker-controlled script to submit candidate registration codes that happen to match a sent registration code in one of a plurality of concurrent device registrations sessions.
3. The medium of any one of embodiments 1-2, wherein: the designated application is a trusted native application executing on a mobile computing device; the trusted native application is different from a general purpose mobile web browser; the registration code: is received in association with a message from the second computing device that identifies the second computing device as the other computing device for which registration is requested, is input, before being received, to the trusted native application executing on the second computing device, and is sent by the trusted native application executing on the second computing device; receiving the request to register another computing device comprises receiving a request to designate possession of the other computing device as a second factor in a two-factor authentication protocol in which a password serves as a first factor; the registration code is an 8-or-fewer character alphanumeric string; the trusted native application is installed on the second computing device before receiving the registration code from the second computing device, wherein during installation or configuration of the native application, the second computing device registers the native application to receive push communications; the instruction to the designated application executing on the second computing device instructing the designated application to send the value indicative of access to the cryptographic key is sent as a push communication without the second computing device sending a request for the message with a network address indicating where to send the instruction; the value indicative of access to the cryptographic key is based on an asymmetric key encryption digital signature using the cryptographic key as a first key of the digital signature; the second key is a different key of the asymmetric key encryption digital signature different from the first key; and determining the received registration code was sent by the designated application comprises determining based on the second key that the asymmetric key encryption digital signature was signed by a computing device with access to the first key of the digital signature.
4. The medium of any one of embodiments 1-3, wherein: sending the instruction to the designated application executing on the second computing device comprises sending a push message, the operations comprise: receiving, via a network, a registration of the second computing device to receive push messages, the push messages being deliverable to the second computing device without the second computing device sending a pull request for the messages with a network communication that indicates a network address of the second computing device and port of the network address through which the second computing device is prepared to receive messages; causing the network address of the second computing device to be ascertained before sending the push message based on the registration.
5. The medium of any one of embodiments 1-4, the operations comprise: wherein the message to the designated application executing on the second computing device is processes by an event handler of the designated application executing in a background process on the second computing device, such that the user is not alerted to the message or involved in sending the value indicative of access to the cryptographic key after sending the registration code via the second computing device.

6. The medium of any one of embodiments 1-5, wherein: the value indicative of access is an output that is cryptographically signed with a private key of the second computing device before being sent by the second computing device, the private key being inaccessible to applications other than the designated application; the reference value is a public key corresponding to the private key; and determining that the received registration code was sent by the designated application comprises: verifying, with the public key, that the value is an output that was cryptographically signed with the private key.

7. The medium of any one of embodiments 1-6, the instructions stored by the medium comprising instructions executed by the second computing device, wherein the instructions executed by the second computing device cause the second computing device to effectuate operations comprising: presenting on a display of the second computing device, responsive to instructions of the designated application executed by the second computing device, a user interface with a user input to receive the registration code; receiving, by the second computing device, via the user input of the user interface, the registration code; receiving, by the designated application, the instruction to send the value indicative of access to the cryptographic key; and in response to receiving the instruction to send the value, by the second computing device, accessing the cryptographic key or a cryptographic key in a cryptographic key chain including the cryptographic key.

8. The medium of embodiment 7, wherein: the designated application is executed within a secure sandbox of the operating system of the second computing device, wherein the secure sandbox prevents other applications executing on the second computing device from accessing at least some aspects of program state of the designated application in memory of the second computing device, wherein the second computing device effectuates operations comprising: assigning the designated application an application-specific identifier by an operating system of the second computing device; determining that the designated application is permitted to access the cryptographic key based on the application-specific identifier by a kernel of the operating system of the second computing device.

9. The medium of embodiment 7, wherein: the cryptographic key is accessed via a trusted execution environment of the second computing device, wherein the second computing device includes a plurality of processors, and wherein the trusted execution environment is executed by a different processor from one or more processors executing the designated application, and wherein the trusted execution environment is configured to: encrypt the cryptographic key or a key in a cryptographic key chain including the cryptographic key with a key written during manufacturing of a computer chip including the processor executing the trusted execution environment; after encrypting the cryptographic key or the key in the cryptographic key chain including the cryptographic key, storing a result of encrypting in encrypted form in memory that is not part of a memory address space accessible to other processors of the second computing device; receiving an interrupt in a buffer of the trusted execution environment; and in response to the interrupt, retrieving the cryptographic key or the key in the cryptographic key chain including the cryptographic key in encrypted form and descripting the cryptographic key or the key in the cryptographic key chain including the cryptographic key.

10. The medium of embodiment 7, the second computing device is caused to effectuate operations comprising: calculating, with the second computing device, a hash value based on a bit sequence of stored computer code encoding at least part of the designated application; determining, based on the hash value, that the designated application has not been modified so as to render the designated application untrusted.

11. The medium of any one of embodiments 1-10, the operations comprising: sending another registration code to a third computing device; receiving the other registration code from a fourth computing device; sending another instruction to the fourth computing device instructing the fourth computing device to send a value indicative of access to a cryptographic key; determining, based on a response from the fourth computing device or an absence of a response, that the registration code was not sent by a trusted instance of the designated application executing on the fourth computing device; and in response to determining that the registration code received from the fourth computing device was not sent by a trusted instance, determining to not register the fourth computing device.

12. The medium of any one of embodiments 1-11, the operations comprising: after receiving the registration code, determining that less than a threshold amount of registration code submissions have been received from the second computing device during a trailing duration of time.

13. The medium of 12, wherein: the second computing device is an Internet-of-things appliance having an embedded system that communicates via a wireless local area network with other Internet-of-things appliances on the same wireless local area network.

14. The medium of any one of embodiments 1-13, wherein: sending an instruction to the designated application compress steps for push communication; and determining that the received registration code was sent by the designated application comprises steps for authenticating a digital signature 15. The medium of any one of embodiments 1-14, the operations comprising: registering the second computing device as the supplemental factor for the user account; after registering the second computing device as the supplemental factor, receiving a request from the first computing device or a third computing device to authenticate the user as authorized to access resources associated with the user account; receiving an authentication credential associated with the result to authenticate the user; determining that the second computing device is designated as the supplemental factor; sending an authentication code to either: the first or third computing device, or the second computing device; receiving a value indicative of access to the authentication code from a different computing device than the computing device to which the authentication code was sent, wherein the authentication code is received from either: the first or third computing device, or the second computing device; determining, based on receiving the value indicative of access to the authentication code, and based on receiving the authentication credential, to authenticate the user.

16. The medium of embodiment 15, the operations comprising: in response to determining to authenticate the user, obtaining an access token string and a uniform resource identifier of an online resource for which the user seeks access; sending the first or third computing device a redirect instruction that includes the access token appended to the uniform resource identifier to cause the first or third computing device to send the access token to a server providing access to the resource for which the user seeks access.

17. The medium of embodiment 16, the operations comprising: providing access to the resource for which the user seeks access.

18. A tangible, non-transitory, machine-readable medium storing instructions that when executed by a data processing apparatus cause the data processing apparatus to perform operations comprising: the operations of any one of embodiments 1-17.

19. A system, comprising: one or more processors; and memory storing instructions that when executed by the processors cause the processors to effectuate operations comprising: the operations of any one of embodiments 1-17.

What is claimed is:

1. A tangible, non-transitory, machine-readable medium storing instructions that when executed by one or more processors effectuate operations comprising:
   receiving, via a network, a request from a first computing device to register another computing device:
      as a supplemental factor in a multi-factor authentication protocol, or
      as an embedded system authorized to access a distributed computing application;
   after receiving the request, sending to the first computing device, via a network, a registration code to be entered in a designated application executing on another computing device to demonstrate possession of the other computing device to be registered;
   after sending the registration code to the first computing device, receiving the registration code, via a network, from a second computing device;
   sending an instruction to the designated application executing on the second computing device instructing the designated application to send a value indicative of access to a cryptographic key stored in memory of the second computing device,
      wherein cryptographic key is stored in a location or format accessible to the designated application but not to other untrusted applications executing on the second computing device;
   receiving, via the network, from the designated application executing on the second computing device, the value indicative of access to the cryptographic key;
   determining, based on the received value and a reference value stored in memory that the received registration code was sent by the designated application and not another untrusted application executing on the second computing device; and
   based on the determination, registering in memory the second computing device as the supplemental factor or as authorized to access the distributed computing application, wherein:
   sending the instruction to the designated application executing on the second computing device comprises sending a push message, and
   the operations comprise:
      receiving, via a network, a registration of the second computing device to receive push messages, the push messages being deliverable to the second computing device without the second computing device sending a pull request for the messages with a network communication that indicates a network address of the second computing device and port of the network address through which the second computing device is prepared to receive messages; and
      causing the network address of the second computing device to be ascertained before sending the push message based on the registration.

2. The medium of claim 1, wherein the determination is configured to impede brute force attacks on computing device registration by impairing an attacker's ability to use an attacker-controlled script to submit candidate registration codes that happen to match a sent registration code in one of a plurality of concurrent device registrations sessions.

3. The medium of claim 1, wherein:
   the designated application is a trusted native application executing on a mobile computing device;
   the trusted native application is different from a general purpose mobile web browser;
   the registration code:
      is received in association with a message from the second computing device that identifies the second computing device as the other computing device for which registration is requested,
      is input, before being received, to the trusted native application executing on the second computing device, and
      is sent by the trusted native application executing on the second computing device;
   receiving the request to register another computing device comprises receiving a request to designate possession of the other computing device as a second factor in a two-factor authentication protocol in which a password serves as a first factor;
   the registration code is an 8-or-fewer character alphanumeric string;
   the trusted native application is installed on the second computing device before receiving the registration code from the second computing device, wherein during installation or configuration of the native application, the second computing device registers the native application to receive push communications;
   the instruction to the designated application executing on the second computing device instructing the designated application to send the value indicative of access to the cryptographic key is sent as a push communication without the second computing device sending a request for the message with a network address indicating where to send the instruction;
   the value indicative of access to the cryptographic key is based on an asymmetric key encryption digital signature using the cryptographic key as a first key of the digital signature;
   the second key is a different key of the asymmetric key encryption digital signature different from the first key; and
   determining the received registration code was sent by the designated application comprises determining based on the second key that the asymmetric key encryption digital signature was signed by a computing device with access to the first key of the digital signature.

4. The medium of claim 1, the operations comprise:
   wherein the message to the designated application executing on the second computing device is processes by an event handler of the designated application executing in a background process on the second computing device, such that the user is not alerted to the message or involved in sending the value indicative of access to the cryptographic key after sending the registration code via the second computing device.

5. The medium of claim 1, wherein:
the value indicative of access is an output that is cryptographically signed with a private key of the second computing device before being sent by the second computing device, the private key being inaccessible to applications other than the designated application;
the reference value is a public key corresponding to the private key; and
determining that the received registration code was sent by the designated application comprises:
verifying, with the public key, that the value is an output that was cryptographically signed with the private key.

6. The medium of claim 1, the instructions stored by the medium comprising instructions executed by the second computing device, wherein the instructions executed by the second computing device cause the second computing device to effectuate operations comprising:
presenting on a display of the second computing device, responsive to instructions of the designated application executed by the second computing device, a user interface with a user input to receive the registration code;
receiving, by the second computing device, via the user input of the user interface, the registration code;
receiving, by the designated application, the instruction to send the value indicative of access to the cryptographic key; and
in response to receiving the instruction to send the value, by the second computing device, accessing the cryptographic key or a cryptographic key in a cryptographic key chain including the cryptographic key.

7. The medium of claim 6, wherein:
the designated application is executed within a secure sandbox of the operating system of the second computing device, wherein the secure sandbox prevents other applications executing on the second computing device from accessing at least some aspects of program state of the designated application in memory of the second computing device, wherein the second computing device effectuates operations comprising:
assigning the designated application an application-specific identifier by an operating system of the second computing device;
determining that the designated application is permitted to access the cryptographic key based on the application-specific identifier by a kernel of the operating system of the second computing device.

8. The medium of claim 6, wherein:
the cryptographic key is accessed via a trusted execution environment of the second computing device, wherein the second computing device includes a plurality of processors, and wherein the trusted execution environment is executed by a different processor from one or more processors executing the designated application, and wherein the trusted execution environment is configured to:
encrypt the cryptographic key or a key in a cryptographic key chain including the cryptographic key with a key written during manufacturing of a computer chip including the processor executing the trusted execution environment;
after encrypting the cryptographic key or the key in the cryptographic key chain including the cryptographic key, storing a result of encrypting in encrypted form in memory that is not part of a memory address space accessible to other processors of the second computing device;
receiving an interrupt in a buffer of the trusted execution environment; and
in response to the interrupt, retrieving the cryptographic key or the key in the cryptographic key chain including the cryptographic key in encrypted form and descripting the cryptographic key or the key in the cryptographic key chain including the cryptographic key.

9. The medium of claim 6, the second computing device is caused to effectuate operations comprising:
calculating, with the second computing device, a hash value based on a bit sequence of stored computer code encoding at least part of the designated application;
determining, based on the hash value, that the designated application has not been modified so as to render the designated application untrusted.

10. The medium of claim 1, the operations comprising:
sending another registration code to a third computing device;
receiving the other registration code from a fourth computing device;
sending another instruction to the fourth computing device instructing the fourth computing device to send a value indicative of access to a cryptographic key;
determining, based on a response from the fourth computing device or an absence of a response, that the registration code was not sent by a trusted instance of the designated application executing on the fourth computing device; and
in response to determining that the registration code received from the fourth computing device was not sent by a trusted instance, determining to not register the fourth computing device.

11. The medium of claim 1, the operations comprising:
after receiving the registration code, determining that less than a threshold amount of registration code submissions have been received from the second computing device during a trailing duration of time.

12. The medium of claim 1, wherein:
the second computing device is an Internet-of-things appliance having an embedded system that communicates via a wireless local area network with other Internet-of-things appliances on the same wireless local area network.

13. The medium of claim 1, wherein:
sending an instruction to the designated application compress steps for push communication; and
determining that the received registration code was sent by the designated application comprises steps for authenticating a digital signature.

14. The medium of claim 1, the operations comprising:
registering the second computing device as the supplemental factor for the user account;
after registering the second computing device as the supplemental factor, receiving a request from the first computing device or a third computing device to authenticate the user as authorized to access resources associated with the user account;
receiving an authentication credential associated with the result to authenticate the user;
determining that the second computing device is designated as the supplemental factor;
sending an authentication code to either:
the first or third computing device, or
the second computing device;
receiving a value indicative of access to the authentication code from a different computing device than the computing device to which the authentication code was sent, wherein the authentication code is received from either:
the first or third computing device, or
the second computing device;
determining, based on receiving the value indicative of access to the authentication code, and based on receiving the authentication credential, to authenticate the user.

15. The medium of claim 14, the operations comprising:
in response to determining to authenticate the user, obtaining an access token string and a uniform resource identifier of an online resource for which the user seeks access;
sending the first or third computing device a redirect instruction that includes the access token appended to the uniform resource identifier to cause the first or third computing device to send the access token to a server providing access to the resource for which the user seeks access.

16. The medium of claim 15, the operations comprising:
providing access to the resource for which the user seeks access.

17. A method, comprising:
receiving, via a network, a request from a first computing device to register another computing device:
as a supplemental factor in a multi-factor authentication protocol, or
as an embedded system authorized to access a distributed computing application;
after receiving the request, sending to the first computing device, via a network, a registration code to be entered in a designated application executing on another computing device to demonstrate possession of the other computing device to be registered;
after sending the registration code to the first computing device, receiving the registration code, via a network, from a second computing device;
sending an instruction to the designated application executing on the second computing device instructing the designated application to send a value indicative of access to a cryptographic key stored in memory of the second computing device,
wherein cryptographic key is stored in a location or format accessible to the designated application but not to other untrusted applications executing on the second computing device;
receiving, via the network, from the designated application executing on the second computing device, the value indicative of access to the cryptographic key;
determining, based on the received value and a reference value stored in memory that the received registration code was sent by the designated application and not another untrusted application executing on the second computing device;
based on the determination, registering in memory the second computing device as the supplemental factor or as authorized to access the distributed computing application, wherein sending the instruction to the designated application executing on the second computing device comprises sending a push message;
receiving, via a network, a registration of the second computing device to receive push messages, the push messages being deliverable to the second computing device without the second computing device sending a pull request for the messages with a network communication that indicates a network address of the second computing device and port of the network address through which the second computing device is prepared to receive messages; and
causing the network address of the second computing device to be ascertained before sending the push message based on the registration.

18. The method of claim 17, comprising:
presenting on a display of the second computing device a user interface with a user input to receive the registration code;
receiving, by the second computing device, via the user input of the user interface, the registration code;
receiving, by the designated application, the instruction to send the value indicative of access to the cryptographic key; and
in response to receiving the instruction to send the value, by the second computing device, accessing the cryptographic key or a cryptographic key in a cryptographic key chain including the cryptographic key.

19. The method of claim 17, wherein:
the value indicative of access is an output that is cryptographically signed with a private key of the second computing device before being sent by the second computing device, the private key being inaccessible to applications other than the designated application;
the reference value is a public key corresponding to the private key; and
determining that the received registration code was sent by the designated application comprises:
verifying, with the public key, that the value is an output that was cryptographically signed with the private key.

20. The method of claim 17, comprising actions executed by the second computing device, comprising:
presenting on a display of the second computing device, responsive to instructions of the designated application executed by the second computing device, a user interface with a user input to receive the registration code;
receiving, by the second computing device, via the user input of the user interface, the registration code;
receiving, by the designated application, the instruction to send the value indicative of access to the cryptographic key; and
in response to receiving the instruction to send the value, by the second computing device, accessing the cryptographic key or a cryptographic key in a cryptographic key chain including the cryptographic key.

* * * * *